(No Model.) 2 Sheets—Sheet 1.
G. B. WILLIAMS.
ENGINEER'S VALVE FOR FLUID PRESSURE BRAKES.
No. 559,243. Patented Apr. 28, 1896.
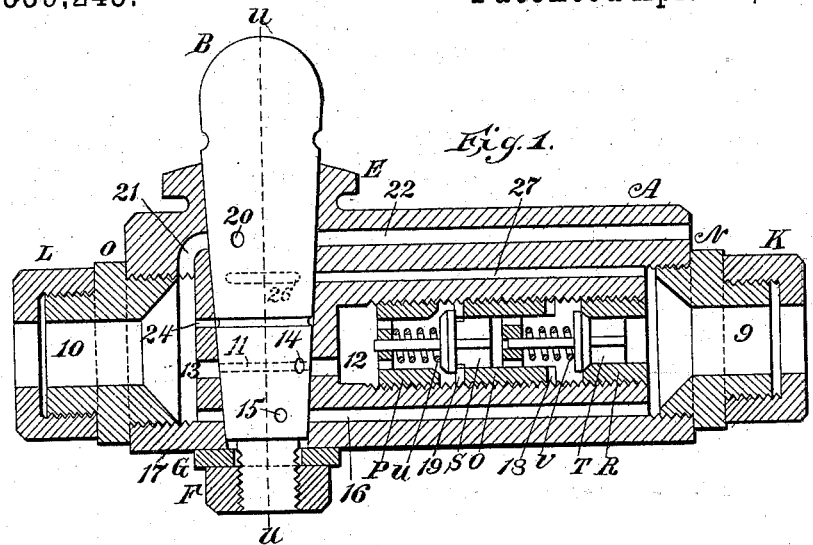
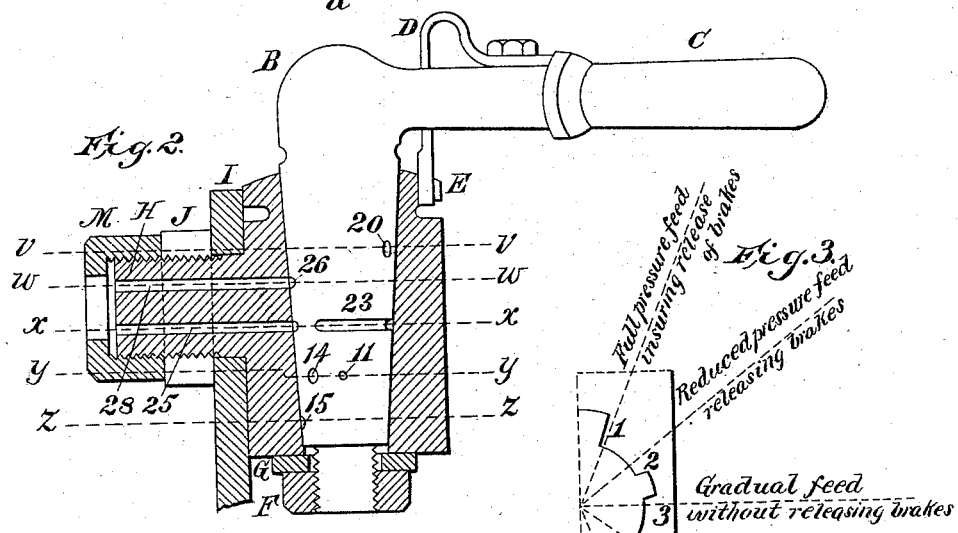
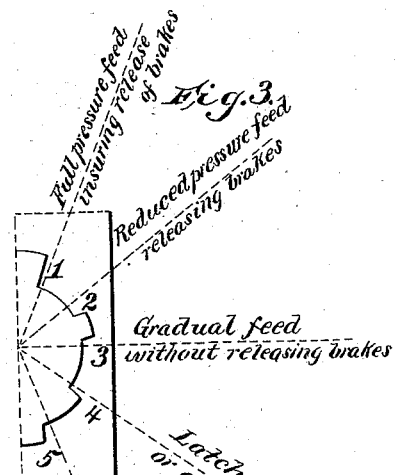
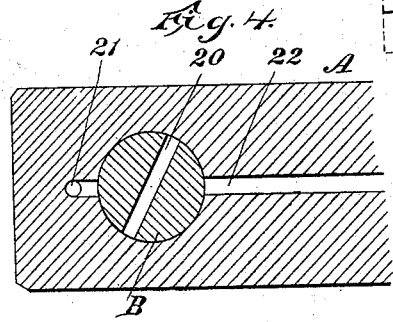
WITNESSES:
T. J. Hogan.
P. E. Gaither.
INVENTOR,
Geo. B. Williams,
by J. Snowden Bell
Att'y.

(No Model.) 2 Sheets—Sheet 2.

G. B. WILLIAMS.
ENGINEER'S VALVE FOR FLUID PRESSURE BRAKES.

No. 559,243. Patented Apr. 28, 1896.

WITNESSES:

INVENTOR:
George Bayley Williams,

UNITED STATES PATENT OFFICE.

GEORGE BAYLEY WILLIAMS, OF LA CROSSE, WISCONSIN, ASSIGNOR TO THE WESTINGHOUSE AIR BRAKE COMPANY, OF PITTSBURG, PENNSYLVANIA.

ENGINEER'S VALVE FOR FLUID-PRESSURE BRAKES.

SPECIFICATION forming part of Letters Patent No. 559,243, dated April 28, 1896.

Application filed December 16, 1887. Serial No. 258,115. (No model.)

*To all whom it may concern:*

Be it known that I, GEORGE BAYLEY WILLIAMS, a citizen of the United States, residing at La Crosse, in the county of La Crosse and State of Wisconsin, have invented or discovered certain new and useful Improvements in Engineers' Valves for Fluid-Pressure Brakes, of which the following is a specification.

The objects of my invention are, first, to simplify the construction and straighten the channels in cocks for fluid-pressure brakes; secondly, to increase the efficiency of the reducing and retaining valves; thirdly, to provide for a gradual feed into main air-pipe and auxiliary reservoirs without releasing the brakes, and, fourthly, to render the indication of the necessary pressures automatic as the lever of engineer's valve is turned.

My invention, generally stated, consists of a valve-case in which the various necessary channels are as straight and direct as circumstances will admit, of a plug in same for controlling the passage of compressed air through said channels, of separate reducing and retaining valves each properly adjusted so as to best serve the purpose for which it is intended, and of suitable channels or grooves, or a combination of both, by means of which the various pressures may be automatically registered on air-gage, as desired, while the lever of valve is being turned.

My improvements, as claimed, are hereinafter fully set forth.

Reference is to be had to the accompanying drawings, forming a part of this specification, in which similar references indicate corresponding parts in all the figures.

Figure 5:
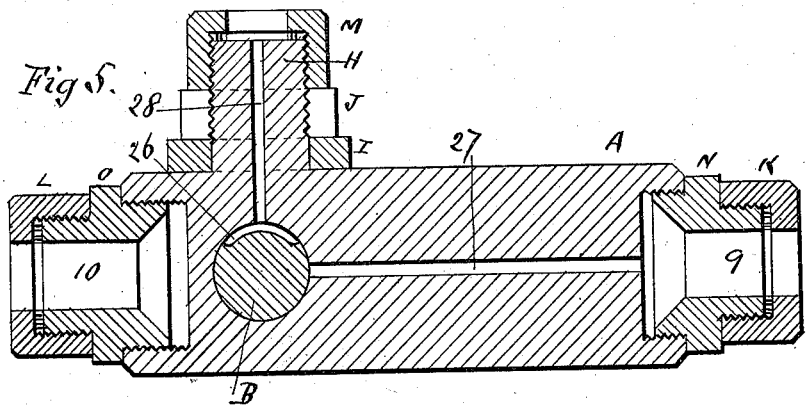
Figure 6:
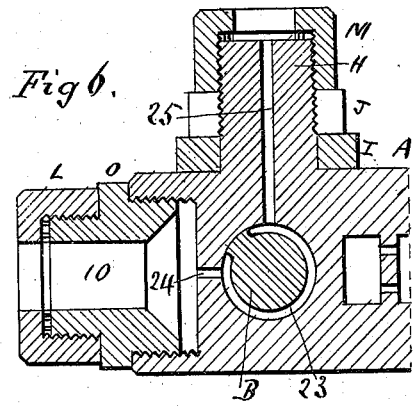
Figure 7:
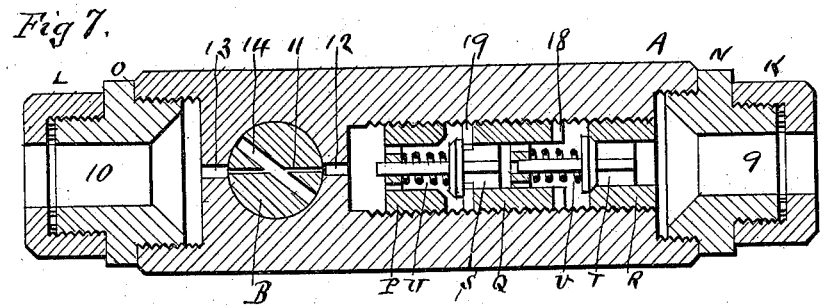
Figure 8:
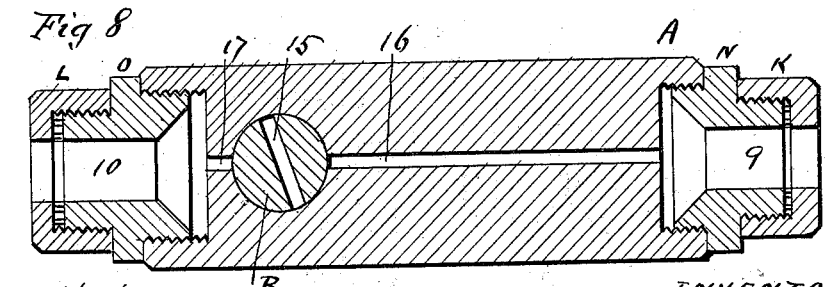

Figure 1 is a longitudinal central vertical section of my improvement. Fig. 2 is a similar view of same on line $u\ u$ of Fig. 1. Fig. 3 is a plan view of the lever-segment, indicating the various positions of the valve-plug. Fig. 4 is a sectional plan view of part of my improvement on the lines $v\ v$ of Fig. 2. Fig. 5 is a sectional plan view of part of my improvement on the lines $w\ w$ of Fig. 2. Fig. 6 is a sectional plan view of part of my improvement on the lines $x\ x$ of Fig. 2. Fig. 7 is a sectional plan view of my improvement on the lines $y\ y$ of Fig. 2. Fig. 8 is a sectional plan view of my improvement on the line $z\ z$ of Fig. 2.

In the drawings the plug B is shown in the same position in each of the figures.

My improved engineer's brake-valve consists of a case or body A, a plug B, having a lever C, the latter having a spring-latch D bent downward and adapted to engage successively the points 1 2 3 4 5 on the segment E, which points indicate the various positions of the lever C, as illustrated in Fig. 3. The plug B is secured in place by a nut F, tightening on washer G, or said plug may be secured in any other suitable manner. The valve-case A is provided with a stud H for enabling the valve to be rigidly secured to bracket I by means of nut J. Connections are made from valve to main reservoir by means of nipple N and union-nut K to main air-pipe by means of nipple $o$ and union-nut L, and to air-gage by means of union-nut M, or in any other suitable manner. In a chamber provided for same are screwed auxiliary valve-casings P, Q, and R for retaining-valve S and reducing-valve T, which are actuated by springs U and V, respectively. The retaining-valve S is used for closing the approach to channel 12 and saving what pressure there is in main reservoir whenever air is exhausted from main air-pipe 10 by means of the engineer's or conductor's valve, or by the breaking of a hose or other connection. The reducing-valve T is used because it is advisable to charge the auxiliary reservoirs with less pressure than what is contained in the main reservoir in order that an extra pressure may be left in main reservoir for promptly releasing the brakes.

Valves S and T being for different purposes require to be actuated by springs differing in strength and preferably also in elasticity. Whenever the pressure in the main reservoir and in the supply-pipe is greater than spring U and the main air-pipe pressure combined, then valve S will seat. It is evident that the same difference in pressure on the opposite sides of valve T which causes said valve to open should not be sufficient to close valve S. Spring U should resist about thirty pounds to the square inch, while spring V should resist only about twenty pounds pressure to the square inch. The reducing and retaining valves may be arranged on either side of plug B, but it is not advisable to have the exhaust-channel blocked by either of them.

The air from the main reservoir enters valve through supply-channel 9, from which it passes into main air-pipe 10 through two different channels. In order that a greater pressure may be saved in main reservoir for insuring the release of the brakes, the auxiliary reservoirs are charged through check-valve T, which reduces the pressure passing through it correspondingly to the pressure of spring V. Reducing-valve T is prevented from obstructing the flow of air on its opposite side by means of the wrench-notches 18 in casing Q. Similar notches 19, on the opposite end of casing Q, allow the air to readily pass by retaining-valve S, unless the difference in pressures on its opposite sides causes it to close. Other suitable grooves or channels may be substituted for notches 18 and 19, respectively, or the valves may be otherwise checked so they can never rest on the respective ends of casing Q. After passing through reducing-valve T and retaining-valve S the air may pass through channel 11 in plug B, which registers with channels 12 and 13, thus making a gradual feed into main air-pipe 10 for recharging the auxiliary reservoirs without releasing the brakes, or it may pass through a larger channel 14, which also registers with channels 12 and 13. Channels 11 and 14 may be placed in different planes without any change from the spirit of my invention. Through the other channel 15 in plug B, which registers with channels 16 and 17, the full pressure of main reservoir may be conveyed into main air-pipe for insuring the release of the brakes. Air is exhausted from the main air-pipe 10 through channel 20 in plug B, registering with channels 21 and 22, for the purpose of applying the brakes.

In the plug B is formed an annular groove 23, passing nearly around said plug, and registering with channels 24 and 25, leading from main air-pipe 10 and to air-gage, respectively. A shorter groove 26 is also formed in plug B, which registers with the channel 27, leading from main reservoir, and with channel 28, leading to air-gage. By means of these grooves and the channels with which they register the pressures in main air-pipe and in main reservoir, respectively, are automatically indicated on air-gage as the lever of valve is turned, the latter being preferably indicated only when lever is at latch or cut-off position 4, Fig. 3, as shown in the drawings, Fig. 6.

The operation is as follows: The lever is moved to position 2, Fig. 3, which results in causing channel 14 in plug B to register with channels 12 and 13 when it is desired to charge the auxiliary reservoirs with reduced pressure through check-valve T. It being desired to apply the brakes, the lever is moved to position 5, Fig. 3, which causes channel 20 in plug B to register with channels 21 and 22. As much pressure is allowed to pass from main air-pipe into the open air as is equal to the pressure with which it is desired to apply the brakes when the lever is moved to position 4, Fig. 3, or cut-off. If it is now desired to recharge the auxiliary reservoirs without releasing the brakes, the lever is moved to position 3, Fig. 3, which causes channel 11 in plug B to register with channels 12 and 13, as shown in Fig. 7. The method in which this gradual feed through channel 11 will recharge the auxiliary reservoirs without releasing the brakes is the subject-matter of Letters Patent No. 386,514, granted to me July 24, 1888.

The lever may be allowed to remain in position 3 to keep the reservoirs charged while the brakes are on in the same manner in which it is allowed to remain in position 2 for keeping the reservoirs charged while the brakes are off. When it is desired to release the brakes, the lever is moved to position 1, Fig. 3, which causes channel 15 in plug B to register with channels 16 and 17, allowing the full pressure in main reservoir to pass into main air-pipe for raising pistons of triple valves to the upper extremity of their traverse for the release of the brakes. As soon as this has been accomplished, which is known by the sound of air escaping from brake-cylinders, the lever is quickly moved to position 2, Fig. 3, in order that the auxiliary reservoirs may only be charged with the proper reduced pressure. Whenever it is desired to know the pressure in main reservoir, the lever is moved to position 4, Fig. 3, or cut-off.

The manner in which pressures are automatically indicated in my improvement, in combination with pressure-feeding, is applicable to all cocks and valves of any kind for controlling fluid-pressure for any purpose whatever, and I hereby reserve the right to any and all such combinations.

The separate reducing and retaining valves are also applicable for use with other cocks and valves for controlling fluid-pressure for various purposes, special casings being made to hold such valves when necessary, and my invention fully provides for meeting all such demands of any kind whatever.

The positions shown for the lever of valve in Fig. 3 may be reversed or otherwise varied without departing from my invention.

Modifications of structure, changes of form, and substitution of devices which are the mechanical equivalents of those described, the mode of operation remaining substantially the same, are hereby included herein.

I am aware of the existence of a construction in which a spring-actuated double-faced combined reducing and retaining valve is intended to perform the same work as the separate and independently-adjusted reducing and retaining valves in my improvement, and such double-faced spring-actuated valve, which cannot efficiently perform the work of two separate valves with springs necessarily differing in strength, I hereby disclaim.

I claim as my invention—

1. In a fluid-pressure brake mechanism the combination with an engineer's brake-valve of a connection to the main reservoir, a connection to the main train-pipe, and a connection to a pressure-gage, and ports in the engineer's valve whereby the main reservoir or the main train-pipe may be put in communication with the connection to the gage, substantially as specified.

2. In a fluid-pressure brake mechanism the combination with an engineer's brake-valve of a connection to the main reservoir, a connection to the main train-pipe, and a connection to a pressure-gage, and ports in the engineer's valve whereby the main train-pipe communicates with the gage connection whenever air is being supplied to or released from the train-pipe, substantially as specified.

3. In a fluid-pressure brake mechanism the combination with an engineer's brake-valve of passages leading from the main reservoir and train-pipe to a gage connection, and ports in the engineer's valve by which the main reservoir or train-pipe may be connected at will with the gage connection, said ports and passages being so arranged that the main reservoir will communicate with the gage connection when the valve is in the lap or cut-off position, substantially as specified.

4. In a fluid-pressure brake mechanism, the combination, with an engineer's brake-valve, of a pressure-retaining valve, and a pressure-reducing valve in the passage leading from the main reservoir to the retaining-valve, substantially as set forth.

5. In a fluid-pressure brake mechanism, the combination, with an engineer's brake-valve, of a spring-pressed pressure-reducing valve, and a spring-pressed pressure-retaining valve in the passage leading from the main reservoir between the reducing-valve and the engineer's brake-valve, substantially as set forth.

GEORGE BAYLEY WILLIAMS.

Witnesses:
T. W. HOADLEY,
M. A. BENEDICT.